Patented Nov. 17, 1931

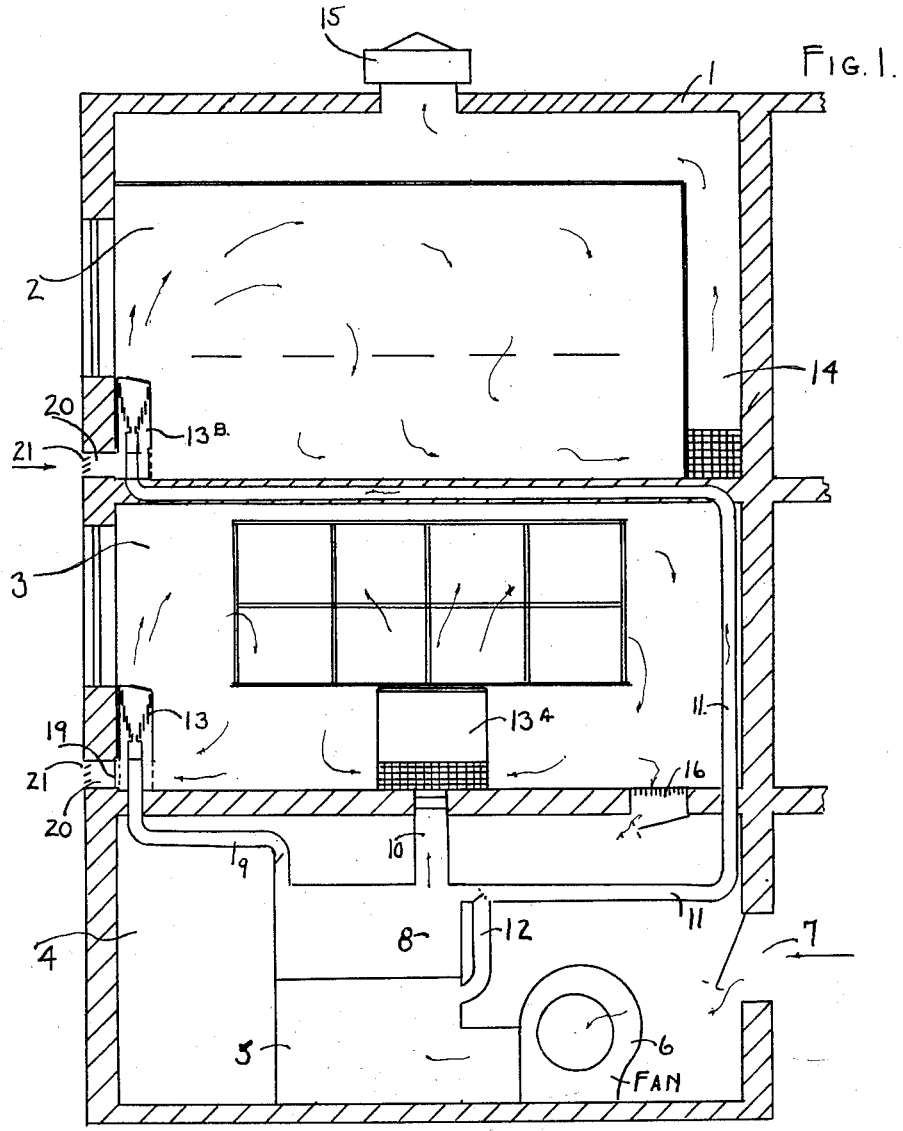

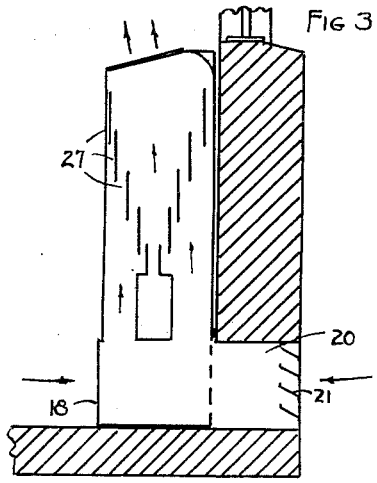
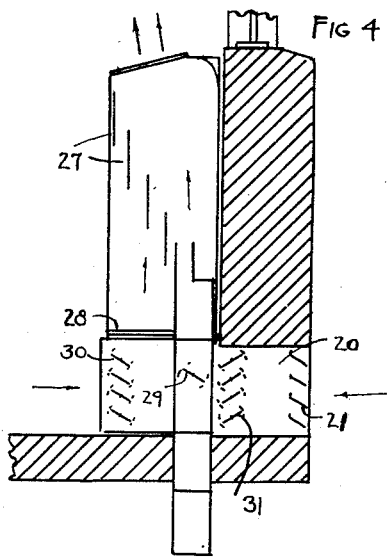
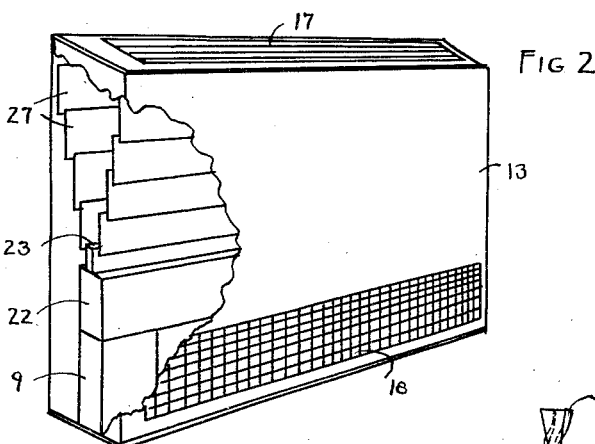
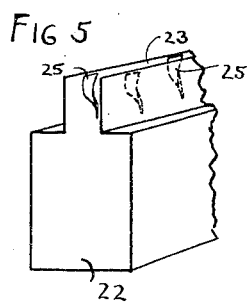
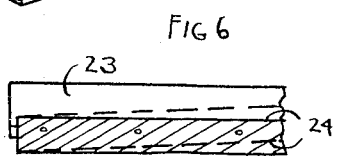
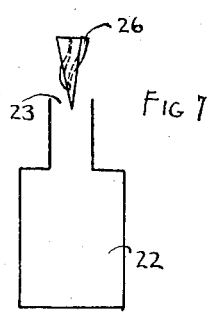

1,832,638

UNITED STATES PATENT OFFICE

FRANCIS A. KITCHEN, OF KANSAS CITY, MISSOURI

METHOD FOR HEATING AND VENTILATING AND APPARATUS USED THEREFOR

Application filed June 23, 1927. Serial No. 200,869.

This invention relates to improvements in a method for heating and ventilating and apparatus used therefor, and refers more particularly to a method in which heated air is distributed to the space to be heated by a forced draft to induce circulation of the air in said space by recirculation of the interior air and with or without the addition of exterior or atmospheric air. Furthermore, the invention has to do with the method of expanding the air in the interior spaces as it is discharged from the distributing ducts so as to induce circulation and turbulence and mixture of the incoming air with the interior air and with air that may be introduced from the exterior.

A further object of the invention is to provide an improved inducing unit which, when connected to a supply of air introduced at high velocity and high temperature, will cause additional air to be drawn into the heated air supply either from a fresh air source outside of the room or from the room itself, and to more advantageously circulate the room so ventilated.

The inducing unit is so constructed that it will deliver air for heating and ventilating at a point below the zone of occupancy within the room or space to be heated and is preferably placed below glass exposure on the outside wall of the room. The zone of occupancy is considered to be below four feet above the floor level, and the inducing unit is designed to draw fresh air from the outside, when desired, to properly maintain air conditions within the room. The unit is also designed to recirculate air from the interior of the room. Both inlets to the unit from the fresh air or atmosphere and recirculated or interior air are located below the zone of occupancy and near the floor line. The outlet to the room from the inducing unit is within the zone of occupancy and in this regard it differs from the common type of air discharge apparatus now used in forced draft ventilation. The low discharge of the unit will allow its being placed below windows or exterior walls with air flow directed vertically over the exposed glass area. The placing of the units beneath windows or exterior walls is possible by reason of the small ducts required when high temperatures and high velocities are used, i. e., in the present system, by the use of higher velocities and higher temperatures, the volume of the air supplied from the heating unit can be considerably diminished and the tempering of the air effected within the room to be heated or substantially at the outlet from the inducing unit.

In the drawings, a simple diagrammatic showing is made of a building with the system installed, but it will be understood that the principles incorporated in this diagrammatic showing can be varied as well as the structure or elements of the system without departing from the scope or spirit of the invention.

Fig. 1 is a sectional view of a portion of a building showing the more important elements of the system.

Fig. 2 is a perspective view of the inducing unit or expansion chamber with a portion of the case or envelope broken away.

Fig. 3 is a sectional view taken through the inducing unit shown in Fig. 2, showing a portion of the outside wall and floor of the building.

Fig. 4 is a modified form of construction of the inducing vanes and the throat of the air outlet or distributing pipe.

Fig. 5 is an enlarged detailed view showing the character of the spiral baffles or vanes in the throat of the distributing pipe.

Fig. 6 shows the damper or valve arrangement for producing an equal volume of air discharge from the distributing pipe.

Fig. 7 is an enlarged detail showing a modified method of producing turbulence at the discharge of the air distributing pipe.

Referring to the drawings, at 1 is shown a portion of a building structure consisting of a second floor room 2, a first floor room 3 and a basement room 4. In the basement or lower room is a heater 5 of any suitable type by means of which the air introduced from the fan 6 is heated before distribution to the rooms of the building. The fan receives its air supply through a fresh air opening 7 and directs the air through the heater where it is raised to the desired temperature. Above the heater is a tempered air chamber 8 to which the distributing pipes 9, 10 and 11 are connected.

If desired, secondary line 12 may be connected into the respective distributing pipes as shown connected into the duct 11, and this line dampered in order to control the temperature of the air circulating through the line. The pipe 9 connects to the inducing unit 13 positioned in the first floor room. The pipe 10 is connected to the inducing unit 13$^a$ also positioned in the first floor room, while the duct 11 is connected to the unit 13$^b$ positioned in the second floor room. In each case, the inducing unit is positioned beneath an outside opening. While this is a preferable location for the unit, it is not essential that these be placed in this position as they will be also effective when positioned on an interior wall or upon a wall where there is no exterior opening.

In Fig. 1 the discharge outlet from the upper floor room is shown as a duct 14 connected to an outlet in the roof designated as 15. The outlet from the lower floor room is in the form of a re-circulating opening 16 by means of which the interior air from the room may be returned to the fan to be re-circulated through the heater. The induction units 13, 13$^a$ and 13$^b$ have a discharge opening 17 in the top thereof, a grated recirculating opening 18 in the front lower portion of the unit, and a fresh air supply opening 19 in the rear of the unit near its bottom. Controlling shutters 30 and 31 regulate the air supply through these openings. This rear fresh air opening communicates through an opening 20 in the outside wall with the atmosphere. Within this opening are positioned louvres 21 which prevent the irregular introduction of fresh air due to the inconstant atmospheric conditions.

The inducing unit 13 comprises an outside casing, as shown in Fig. 2, within which is a horizontal distributing pipe 22 having a narrowed throat discharge 23 which extends substantially the length of the unit. The distributing pipe is connected directly to the distributing duct designated in Fig. 2 as 9. In order to produce a uniform volumetric discharge of air from the throat of the distributing pipe, a damper, such as shown in Fig. 6 and designated as 24, may be used. Within the throat discharge are positioned a plurality of spiral baffles diagrammatically shown at 25 in Fig. 5. The purpose of these baffles is to produce a turbulency in the air discharged from the distributing pipe. In place of the spiral vanes being positioned within the throat of the distributing pipe, baffles or vanes 26 may be positioned above the discharge pipe, as shown in Fig. 7. Above the discharge pipe in the expansion chamber, and positioned in parallel planes and spaced apart relation, are the vanes 27 which set up the induction current produced by the air discharge from the distributing pipe. In Fig. 3 these induction vanes are positioned on both sides of the discharge pipe, while in Fig. 4 in the modified showing the vanes are only in front of the discharge pipe. As suggested, the spiral baffles or vanes within the throat of the discharge pipe give a whirling motion which increases the effect of the induction vanes.

In practice, the air is circulated from the heated air chamber of the heater designated as 8 by the forced draft created by the fan 6 and the heated air discharged from the distributing pipes into the expansion chambers or inducing units 13, 13$^a$ and 13$^b$. These inducing units set up induction currents of the recirculated interior air from the rooms, which air may be mixed with a regulated quantity of exterior air supplied through the outside openings 19. As shown in Fig. 1, the exhausted air may be directed through a discharge pipe to the atmosphere, or may be recirculated through the system as shown in the circulating methods used in the first floor room of the building shown in Fig. 1.

At 28, in Fig. 4, is shown an air cleaner which may be used in the inducing unit or expansion chamber to purify the air passing therethrough.

This improved method of inducing additional fresh air to mix with air forced through the inducing unit results in securing an introduction of air into the room similar in temperature and quantity to that required by accepted and reliable blast systems and allow the placing of inducing units within the room at more advantageous locations than has heretofore been possible. Normally, the circulation in a blast system is created by the introduction of the heated air above the zone of occupancy and from the interior wall so that the circulation of air is against the natural circulation created by the cooler air existing near the exposed glass areas.

The inducing units are so designed as to secure a maximum induction of added air and built in attractive shapes and sizes in order to use minimum floor space within the rooms. The units further permit the use of complete fresh air ventilation of the rooms which has heretofore been impractical with other ventilating devices. It is possible with this system to use not only fresh air introduced through ducts from the blower, but also to induce fresh air in the unit itself.

The smaller volume or quantities of air handled through the blower and heater source outside of the rooms to be heated permit a saving in duct sizes, blower capacities and equipment in general. Where air cleaning devices are used at the blower source, similar cleaning devices can be used in the present system.

The inducing or expansion chambers are so constructed that high velocity air from the supply duct causes a suction or inducing effect and draws additional air through the interior recirculating opening or exterior atmospheric opening, producing a rapid upward circulation through the induction or baffle plates. The resulting mixture of the heated and tempering air is then ejected or discharged through the top grating 17 of the expansion chamber, the air rising vertically from said outlets which are located below the zone of occupancy and preferably below the glass exposure in the room.

It may be necessary, under certain circumstances, to supply the fresh air opening with a damper in addition to the louvre blades to prevent the addition of excessive amounts of cold air.

The blower source and heater outside the room are preferably equipped with a device to supply moisture to the air in order to produce the necessary and desirable humidity. Ozone or other air additional elements may be introduced in this source, if desired.

In brief, the invention contemplates a method in which the blast system of ventilation is used wherein relatively high velocities are employed through the distributing ducts together with expansion chambers or inducing units within the rooms or spaces to be heated. These inducing units function to mix with the heated air from the blower source, either recirculated interior air or a combination of recirculated and exterior air, or all exterior air. The method, as suggested, permits the reduction of the size of the equipment on account of the smaller volume of air handled and the positioning of the discharge members or expansion chambers on the exterior walls or beneath exposed glass areas.

The result of mixing fresh air with heated air from the blower source produces an entirely different temperature leaving the outlet of the mixing unit. The air temperature may be as low as 40° for cooling or considerably above the 120° F. temperature considered most desirable for blast systems of heating. The velocity leaving the mixing unit outlet may vary from fifty feet per minute to three thousand feet per minute and the quantity of air induced may be from ten per cent of the air supplied by the blower to three hundred per cent. The temperature of the air supplied from the blower through the duct may vary from 40° F. for cooling to 300° F. for heating and the velocity from fifty feet per minute to three thousand feet per minute.

A further advantage of the spiral vanes or baffles is the whirling or turbulence that it gives the inducing air. This is particularly important where outside or exterior air is induced because it will more definitely control the quantity of air induced and offset the effect of wind and temperature conditions outside of the building in addition to more rapidly equalizing the temperature of the mixed air.

In the throat of the discharge or distributing pipe may be positioned a damper such as diagrammatically shown at 29 in Fig. 4.

I claim as my invention:

A fan blast system of heating and ventilating comprising a heater, distributing pipes connected thereto and to the rooms to be heated, means for creating a forced air circulation through the distributing pipes, air inducers connected to the distributing pipes and positioned in the zones of occupancy in the rooms to set up air circulation currents in the rooms opposed to the natural air convection currents over the window areas, and discharge means from the rooms for removing vitiated air.

FRANCIS A. KITCHEN.